US011232254B2

(12) United States Patent
Negandhi et al.

(10) Patent No.: US 11,232,254 B2
(45) Date of Patent: Jan. 25, 2022

(54) EDITING MECHANISM FOR ELECTRONIC CONTENT ITEMS

(71) Applicant: MICROSOFT TECHNOLOGY LICENSING, LLC, Redmond, WA (US)

(72) Inventors: Devang Jaysinh Negandhi, Sunnyvale, CA (US); Vivek Tiwari, Sunnyvale, CA (US); Zhenrong Qian, Sunnyvale, CA (US); Sanjay Bysani, Sunnyvale, CA (US); Mahesh Gupta, Sunnyvale, CA (US); Kirill Sergeyevich Lebedev, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 16/146,826

(22) Filed: Sep. 28, 2018

(65) Prior Publication Data

US 2020/0104349 A1 Apr. 2, 2020

(51) Int. Cl.
| | | |
|---|---|---|
| G06F 17/21 | (2006.01) | |
| G06F 40/166 | (2020.01) | |
| G06F 9/54 | (2006.01) | |
| G06F 16/27 | (2019.01) | |
| G06F 40/197 | (2020.01) | |
| G06F 16/958 | (2019.01) | |

(52) U.S. Cl.
CPC ............ *G06F 40/166* (2020.01); *G06F 9/541* (2013.01); *G06F 16/27* (2019.01); *G06F 16/958* (2019.01); *G06F 40/197* (2020.01)

(58) Field of Classification Search
CPC ...... G06F 40/166; G06F 40/197; G06F 9/541; G06F 16/27
See application file for complete search history.

(56) References Cited

U.S. PATENT DOCUMENTS

| | | | | |
|---|---|---|---|---|
| 8,225,219 | B2 * | 7/2012 | Edelen | G06Q 10/107 709/206 |
| 8,307,392 | B2 * | 11/2012 | Ahanger | H04N 21/812 725/36 |
| 8,387,086 | B2 * | 2/2013 | Agarwal | G06Q 30/02 705/14.15 |
| 8,468,051 | B2 * | 6/2013 | Swenson | G06Q 30/0251 705/14.1 |
| 8,554,619 | B2 * | 10/2013 | Juda | G06Q 30/02 705/14.4 |
| 8,738,443 | B2 * | 5/2014 | Davison | G06Q 30/02 705/14.69 |

(Continued)

*Primary Examiner* — Maikhanh Nguyen
(74) *Attorney, Agent, or Firm* — NDWE, LLP.

(57) ABSTRACT

A method and system for reviewing edits and editing content items are provided. An edit to a first version of a first content item is received. The first version of the first content is part of the active content delivery campaign and has been delivered over a computer network to a first plurality of computing devices. The edit is stored in a first storage that is separate from a second storage. An event indicating the edit is inserted into an event processing system. A result approving the edit is received from the event processing system. In response to receiving the result approving the edit, a second version is caused to be stored in the second storage. The second version reflecting the edit is caused to be delivered over the computer network.

20 Claims, 6 Drawing Sheets

(56) References Cited

U.S. PATENT DOCUMENTS

| | | | | |
|---|---|---|---|---|
| 9,225,998 | B2* | 12/2015 | Agarwal | G06Q 30/02 |
| 9,706,052 | B2* | 7/2017 | Bhatia | H04M 3/5175 |
| 10,152,363 | B2* | 12/2018 | Schellenberger | G06F 11/0769 |
| 10,380,648 | B2* | 8/2019 | Dubey | G06Q 30/0242 |
| 2006/0095281 | A1* | 5/2006 | Chickering | G06Q 30/0247 |
| | | | | 705/37 |
| 2006/0095336 | A1* | 5/2006 | Heckerman | G06Q 30/0241 |
| | | | | 705/26.3 |
| 2007/0027771 | A1* | 2/2007 | Collins | G06Q 10/0631 |
| | | | | 705/14.48 |
| 2008/0160956 | A1* | 7/2008 | Jackson | H04M 3/02 |
| | | | | 455/406 |
| 2008/0195468 | A1* | 8/2008 | Malik | G06Q 30/02 |
| | | | | 705/14.53 |
| 2008/0307454 | A1* | 12/2008 | Ahanger | G06Q 30/02 |
| | | | | 725/36 |
| 2008/0319827 | A1* | 12/2008 | Yee | G06Q 30/02 |
| | | | | 705/7.29 |
| 2009/0006375 | A1* | 1/2009 | Lax | G06Q 30/02 |
| 2009/0094073 | A1* | 4/2009 | Cheung | G06Q 30/02 |
| | | | | 705/14.47 |
| 2009/0100109 | A1* | 4/2009 | Turski | G06F 16/176 |
| 2009/0204903 | A1* | 8/2009 | Edelen | G06Q 10/107 |
| | | | | 715/752 |
| 2010/0172626 | A1* | 7/2010 | Lee | G06Q 30/02 |
| | | | | 386/343 |
| 2010/0293059 | A1* | 11/2010 | Davison | G06Q 30/02 |
| | | | | 705/14.69 |
| 2010/0332313 | A1* | 12/2010 | Miller | G06Q 30/0257 |
| | | | | 705/14.44 |
| 2011/0145856 | A1* | 6/2011 | Agarwal | G06Q 30/02 |
| | | | | 725/32 |
| 2011/0161161 | A1* | 6/2011 | Juda | G06Q 30/02 |
| | | | | 705/14.42 |
| 2011/0302028 | A1* | 12/2011 | Swenson | G06Q 30/02 |
| | | | | 705/14.49 |
| 2012/0005254 | A1* | 1/2012 | Riley | G06F 9/546 |
| | | | | 709/201 |
| 2012/0253927 | A1* | 10/2012 | Qin | G06Q 30/0241 |
| | | | | 705/14.49 |
| 2013/0097028 | A1* | 4/2013 | Han | G06Q 30/02 |
| | | | | 705/14.71 |
| 2013/0152124 | A1* | 6/2013 | Agarwal | G06Q 30/02 |
| | | | | 725/32 |
| 2013/0339126 | A1* | 12/2013 | Cui | G06Q 30/02 |
| | | | | 705/14.41 |
| 2014/0040008 | A1* | 2/2014 | Belani | G06Q 30/02 |
| | | | | 705/14.41 |
| 2016/0134711 | A1* | 5/2016 | Croteau | H04W 4/029 |
| | | | | 455/457 |
| 2017/0048390 | A1* | 2/2017 | Bhatia | H04L 41/0896 |
| 2017/0154363 | A1* | 6/2017 | Dubey | G06Q 30/0242 |
| 2018/0336589 | A1* | 11/2018 | Ye | G06Q 30/0251 |

* cited by examiner

EDITING MECHANISM FOR ELECTRONIC CONTENT ITEMS

TECHNICAL FIELD

The present disclosure relates to content item delivery across one or more computer networks and, more particularly to, a review-based editing mechanism for electronic content items.

BACKGROUND

The Internet allows end users operating computing devices to request content from many different publisher systems. Some publishers desire to send content items to users who visit their respective websites or who otherwise interact with the publishers. To do so, publisher systems rely on external content delivery services that deliver the content items over the computer network to computing devices of such users. In some instances, the content provider requests certain edits to be made to the content items which can be caused by undetected errors in the content.

Editing content items has been frequently requested from content providers to address these errors. Typically, a review by a content delivery system is required to ensure that the content is appropriate to be presented on the client device. The review of the content items allows the content delivery system to filter out content items that are deemed to be spam or inappropriate.

However, present technology allows edits to be published immediately for the end user's view without the proper review. In some instances, the present technology does not allow certain content providers to make edits to their content items. This can be problematic because the content delivery system or the content provider do not have an opportunity to review the edits before the edits are published over the network. Consequently, a better approach providing a mechanism to review the edit before the edit is published is needed to provide a better user experience for the end users and the content providers, yet the present technology does not offer good solutions to these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system for reviewing edits and editing content items are provided. An edit to a first version of a first content item is received. The first version of the first content is part of an active content delivery campaign that has been delivered over a computer network to a first plurality of computing devices. The edit can be stored in a first storage that is separate from a second storage. An event is inserted into an event processing system where the event indicates the edit. A result may be received from the event processing system where the result indicates that the edit is approved. In response to receiving the result indicating that the edit is approved, a second version of the first content item is caused to be stored in the second storage where the second version reflects the edit to the first version. The second version of the first content is caused to be delivered over the computer network to a second plurality of computing devices. Reviewing the edits before the edits are published allows serving of the quality content items compatible with the viewing requirements. Prior to this approach, a content provider was limited to viewing the content items after the edits are approved to be made on the publisher system. In some instances, the publisher system only allows editing of the content items from certain content providers. Approaches described herein permit content item providers to verify the edits.

Technical Improvements

Embodiments described herein improve the utility of electronic content delivery methods for the content providers and the end users by providing quality content items compatible with viewing standards and guidelines. Embodiments also improve user experience and interaction with a computing device by reviewing the edits to the content items before the edits are served for publication. Embodiments described herein overcome technical problems specifically arising in an architectural limitation by dynamically reviewing the edits while the edits are approved to be served. Embodiments also avoid the drawback of other methods of serving the content items that are not appropriate for the end user's view.

System Overview

Figure 1:
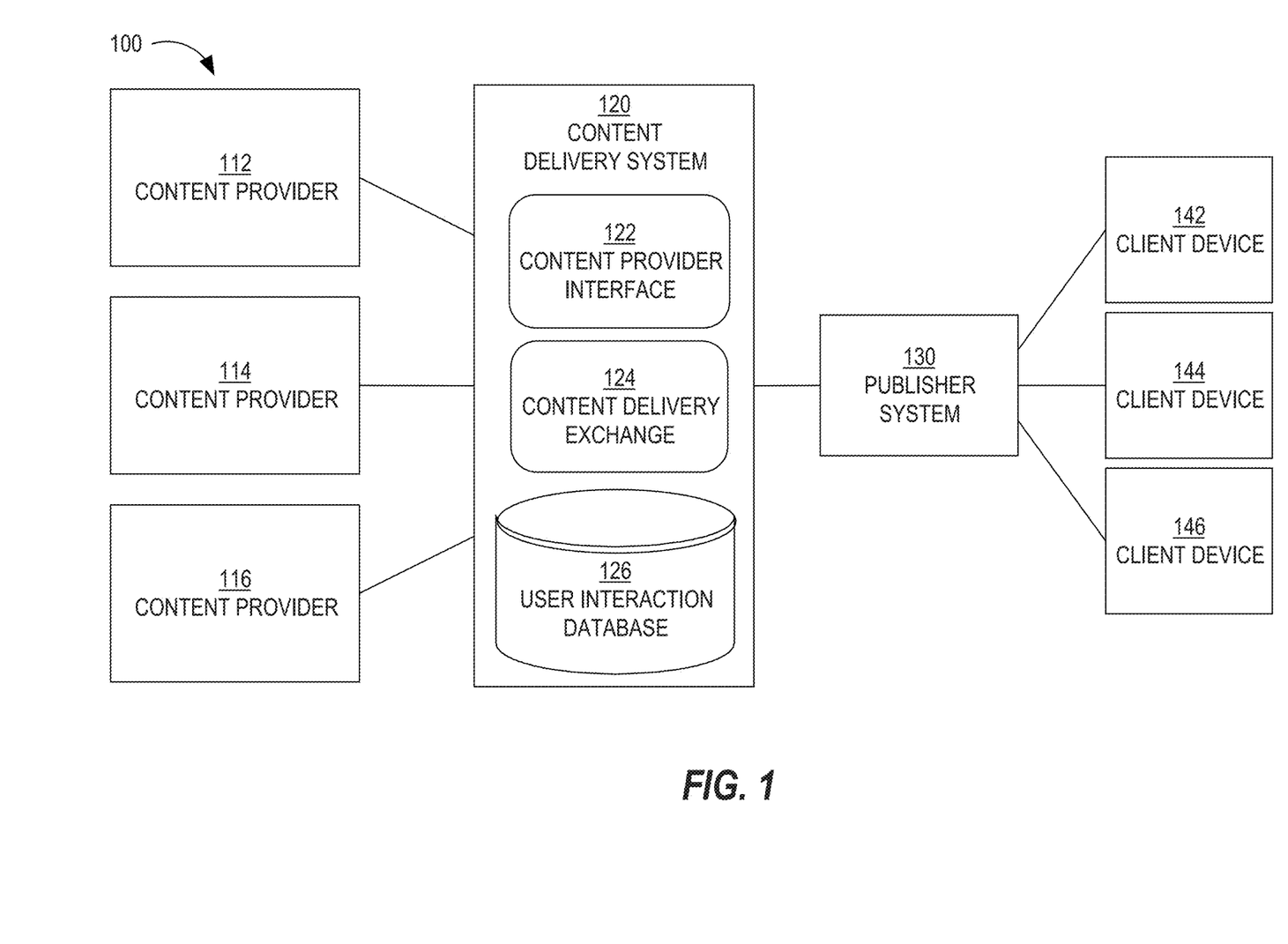
FIG. 1 is a block diagram that depicts a system for distributing content items to one or more end users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Overview of Tracking User Interactions

Content delivery system 120 tracks one or more types of user interactions across client devices 142-146 (and other client devices not depicted). For example, content delivery system 120 determines whether a content item that content delivery exchange 124 delivers is presented at (e.g., displayed by or played back at) a client device. Such a "user interaction" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 126.

For example, content delivery system 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a browser cookie. Thus, if content delivery system 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a browser cookie. If impression data items are generated and processed properly, a click data item should be associated with an impression data item that corresponds to the click data item.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 126. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Switching Content Items

Figure 2A:
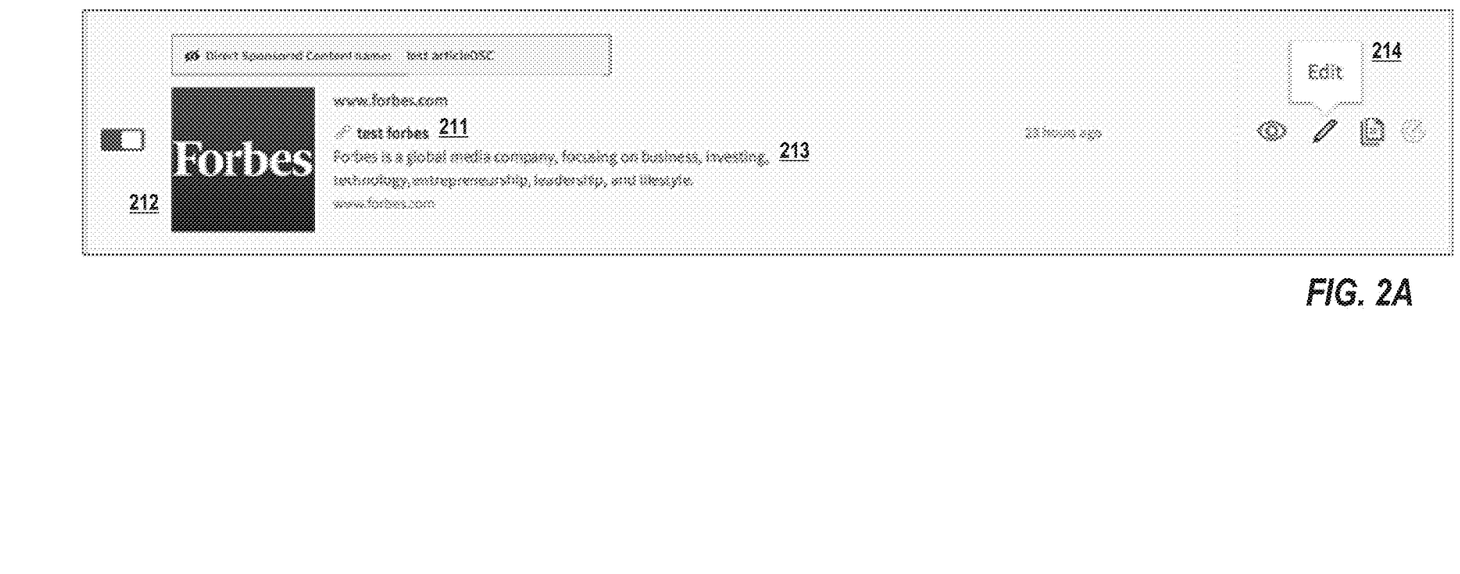
FIGS. 2A-2B are example user interfaces for reviewing edits and editing one or more content items, in an embodiment.
Figure 2B:
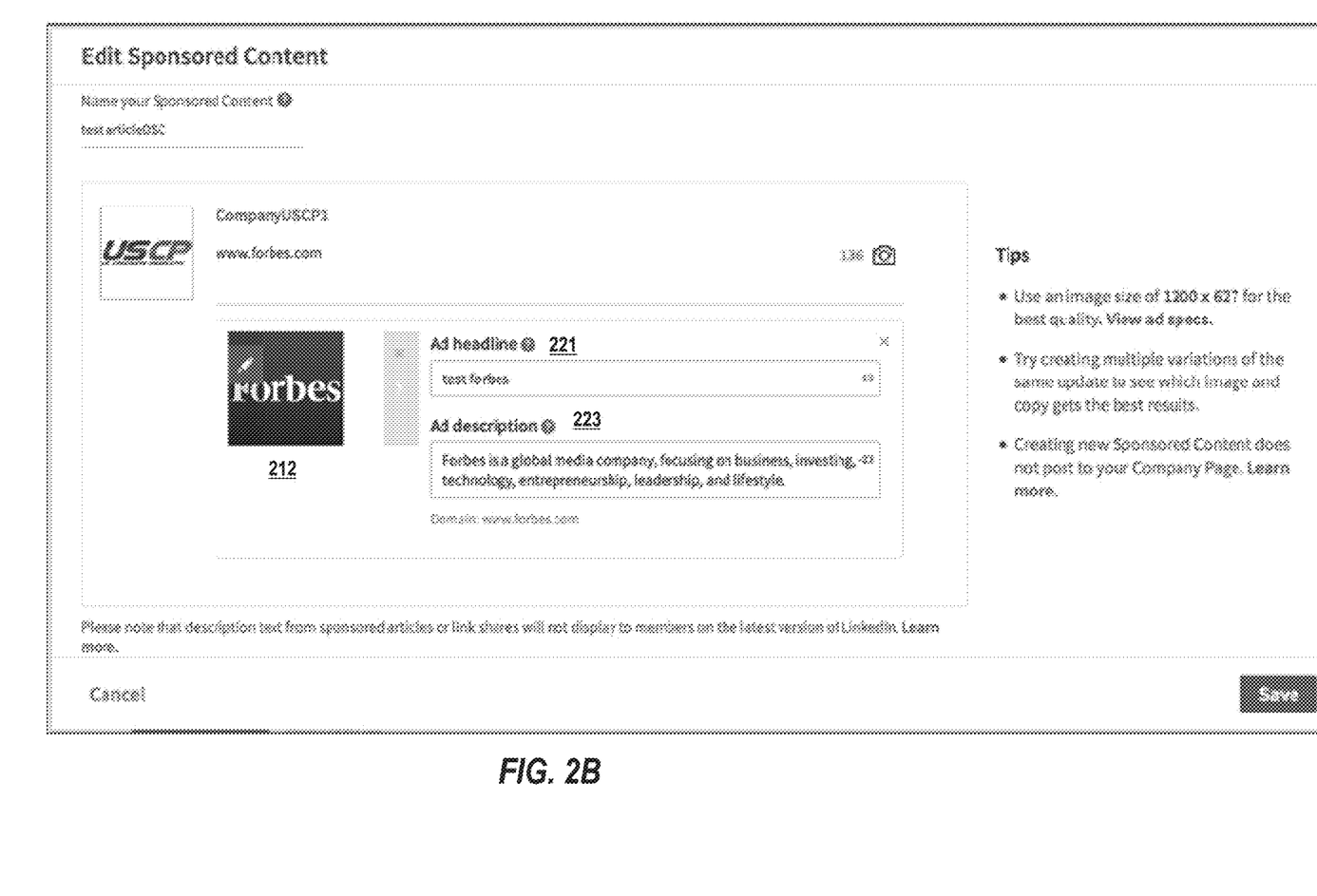

FIGS. 2A-2B are example user interfaces for reviewing edits and editing content items, in an embodiment.

FIG. 2A is a first example user interface, provided by content exchange system 120 that displays a content item 212 that involves an article, image and/or text that originates from a content provider, in an embodiment. The first example user interface includes:
  a content item headline 211 and a content item description 213;
  an edit button 214 which provides a function to edit any of an image of the content item 212, the content item headline 211, or the content item description 213.

The first example user interface may be presented to a content provider of the content item 212. The content item 212, content item headline 211, content item description 213, and the edit button 214 for editing the content item 212 can be displayed in the graphical user interface of a computing device of the content provider. In some embodiments, the first example user interface is not available to the end users of the client devices 142, 144, 146. The end users may view the content item 212, content item headline 211, and content item description 213 in a graphical user interface presented via the client devices 142, 144, 146. However, the edit button 214 is not available in the graphical user interface of the client devices 142, 144, 146 of the end users because the end users of the client devices 142, 144, 146 do not have appropriate permission to make an edit to the content item 212.

FIG. 2B is a second example user interface that displays a user interface after the edit function is activated. Once the edit button 214 is selected, the second example user interface is presented in the graphical user interface of the computing device of the content provider. As illustrated in FIG. 2B, each of the content item 212, the content item headline 221 or the content item description 223 includes a separate box to edit the article, image and/or text. The content delivery system 120 may review and verify the edited content before the edits are published on the content delivery system 120. In some embodiments, the content delivery system 120 may perform a manual review of the edits to determine whether the edit is appropriate to be published.

The content delivery system 120 may perform different types of review based on the type of content provider. The content providers can be categorized into two or more different types. One example type of content provider is a high-trust content provider. The high-trust content provider can be an entity that has built a strong relationship or connection with the content delivery system 120. For example, the high-trust content provider can be a high bidder that interacts with content delivery system 120 that bids for space to present content items. In some cases, the high-trust content provider can be an entity that has had a considerable amount of interactions with the content delivery system 120.

The other example type of content provider is a low-trust content provider. A content provider that is not categorized as a high-trust content provider can be categorized as a low-trust content provider. The low-trust content provider can be an entity that has not yet built a strong relationship or connection with the content delivery system 120. For example, the low-trust content provider can be a low bidder or a content provider who is in the initial stage of building the relationship with the content delivery exchange 124.

To determine whether a first content is associated with a high-trust content provider or a low-trust content provider, the content delivery system 120 may determine a first value associated with a content provider for the first content item. If the first value is below a threshold value, then the content delivery system may determine that the first content provider is a low-trust content provider. If the first value is above the threshold value, then the content delivery system may determine that the first content provider is a high-trust content provider. The threshold value can be set by the content delivery system 120. The first value can be determined based on the number of bids, the price of the bids, the number of interactions with the content delivery system 120, or interaction period with the content delivery system 120. While these factors are shown to illustrate example factors to determine the first value, other factors can be used to determine the first value.

The review process may differ based on the type of the content provider. For example, a content item from a high-trust content provider may require an auto review and a content item from a low-trust content provider may require a manual review which may take a longer time than the auto review. The manual review can be a human-operated review process which may take a couple of hours to complete. The auto review may mark the edit to the content item as pre-approved and the edit can be published immediately on the content delivery system 120 without the manual review. In one embodiment, the edit for the auto review can be inserted into an event processing system. The manual review may require the edit to be inserted into an event processing system which then determines whether the edit is appropriate to be served on the content delivery system 120.

Once the event processing system determines that the edit is approved for publication, the event processing system notifies the content delivery system 120 that the edit can be served. The content delivery system 120 then notifies an administrator that the edit has been approved and the edit to the content item is published on the content delivery system 120.

In some embodiments, the event processing system may reject the edit based on the content of the edit. For example, the event processing system may determine that the edit is not appropriate to be served on the content delivery system 120 based on the viewing guidelines and requirements which are set by the content delivery system 120. The criteria may comprise grammatical errors, bad quality content, illegal content, inappropriate content, censored content, irrelevant content, or political content. The criteria listed above is not an exclusive list and may include other criteria.

Example Content Delivery Process

Figure 3A:
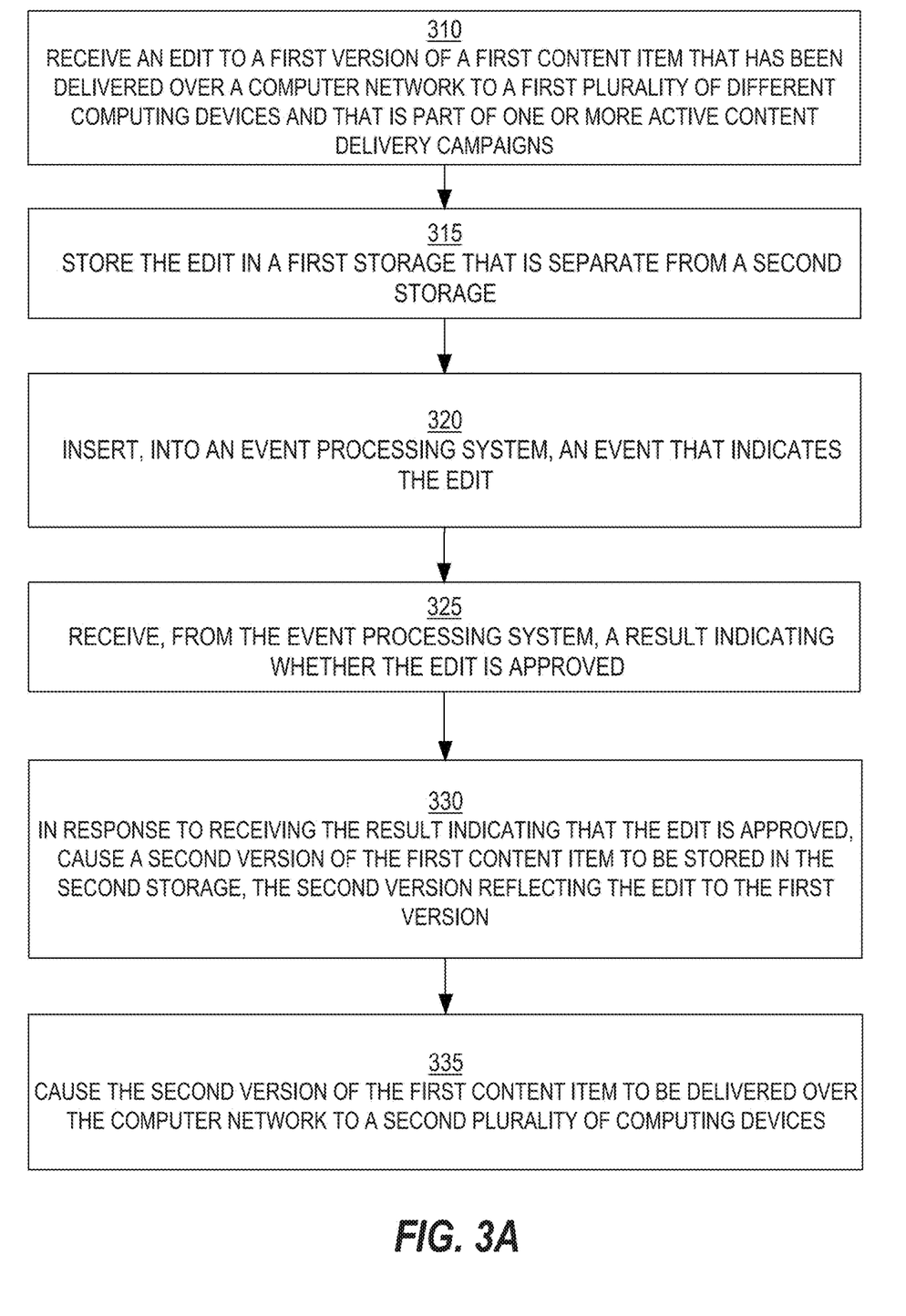
FIGS. 3A-3B are flow diagrams that depict processes for reviewing edits and editing one or more content items, in an embodiment.

FIG. 3A is a flow diagram that depicts a process for reviewing edits and editing content items, in an embodiment. Process 300 may be implemented by content delivery system 120.

At block 310, an edit to a first version of a first content item can be received at the content delivery system 120. The first content item can comprise an article, image, and/or text that originates from a content provider and that has been delivered over a computer network to a first plurality of different computing devices. In some instances, the first content item can be part of one or more active content delivery campaigns.

At block 315, the edit to the first content item is stored in a first storage that is separate from a second storage. The first storage can be a buffer that temporarily stores the edit to the first version of the first content item and the second storage can be a database that stores up-do-date content items. When a content item is selected as a result of a content item selection event and presented on a client device, at least some of the content of the content item is retrieved from the second storage. The edit can be temporarily stored in the first storage for an event processing system to review the edit until the edit is published on the content delivery system 120.

At block 320, the event is inserted into the event processing system where the event indicates the edit. The event processing system can be a human-operated manual review process that detects an error in the edits. The event processing system can determine whether the edit is approved for presentation on the client devices 142, 144, 146. In some instances, the event processing system is implemented by the content delivery system 120. In one embodiment, during the review process, the first content item may still be presented to the client devices 142, 144, 146. The end users may be presented with the edited first content item when the edit is approved by the event processing system, causing time delay for the end users to view the edited first content.

In some embodiments, the content provider may be presented with an option to pause or stop serving the first version of the first content item on the client devices 142, 144, 146 until the review process is completed by the event processing system. The content provider may be presented with information about the type of edit (e.g., minor edits such as grammatical error or major edit such as censored error) and may send a decision to the content delivery system 120 whether the content provider wishes to continue to deliver the first version of the first content provider or stop delivering the first content item until the review process is performed based on severity of the edit. In some instances, if the edit is a minor error and does not impact the quality of the first content item, then the content may wish to present the first content item that is part of the active content delivery campaign. On the other hand, the content may wish to pause delivering the first content item if the edit is major and affects the quality of the first content item.

In some embodiments, the content provider may be presented with time information indicating how long the review process will take based on the type of the content provider and may send a decision to the content delivery system 120 whether the content provider wishes to continue to deliver the first version of the first content provider or stop delivering the first content item until the review process is performed. If it is determined that the first content item is associated with a high-trust content provider, the content provider may be presented with information that may indicate that the review process may take a few minutes and may decide whether it is more beneficial to continue the first version of the first content item to be presented to the client devices 142, 144, 146 or to pause delivering of the first content item on the content delivery system 120 until the manual review process is completed. Alternatively, if it is determined that the first content item is associated with a low-trust content provider, the content provider may be presented with information that indicates that the review process may take a couple of hours due to the manual review process and may decide.

At block 325, a result can be received from the event processing system at the content delivery system 120. The result may indicate that the edit has been approved. In one embodiment, the result may indicate that the edit has been pre-approved. In some embodiments, the edit can be rejected. When the edit is rejected, the edit cannot be published in the content delivery system 120 and the content provider may be notified of the result.

At block 330, in response to receiving the result indicating that the edit is approved, a second version of the first content item is configured to be stored in the second storage. The second version of the first content item reflects the edit to the first content and may include a different article, image and/or text than the first version of the first content item.

At block 335, the second version of the first content item is caused to be delivered over the computer network to a second plurality of computing devices. The second plurality of computing devices can be different from the first plurality of computing devices. In an embodiment, a portion of the second computing devices may overlap with the first plurality of computing devices in that the same end users of the client devices 142, 144, 156 may view both the first version of the first content item and the second version of the first content item. The second version of the first content can also be part of one or more active content delivery campaigns as the first version of the first content item.

In some embodiments, multiple edits can be made to the first version of the first content item. For example, when a first edit received at the content delivery system 120, the first edit is stored in the first storage and inserted into the event processing system. Before the first edit is approved for publication, a second edit can be received subsequently at the content delivery system 120. The second edit can be requested to rectify an error in the first edit that was not detected when the first edit was requested.

In some embodiments, the first edit may be associated with a first identifier and the second edit may be associated with a second identifier. The first edit can be stored in the first storage with the first identifier. The first edit and the first identifier which are stored in the first storage can be replaced with the second edit and the second identifier. The second identifier may be replaced with the first identifier to update a version tag of the content item stored in the first storage. After replacing the first edit with the second edit, the second edit is inserted into the event processing system, thereby allowing the second edit to be reviewed by the event processing system before receiving approval for the first edit. Upon evaluating the second edit, the event processing system may send a result indicating that the second edit is approved for publication. The second edit is caused to be stored in the second storage and, as a result of one or more content item selection events, caused to be delivered over the computer network to one or more computing devices.

Figure 3B:
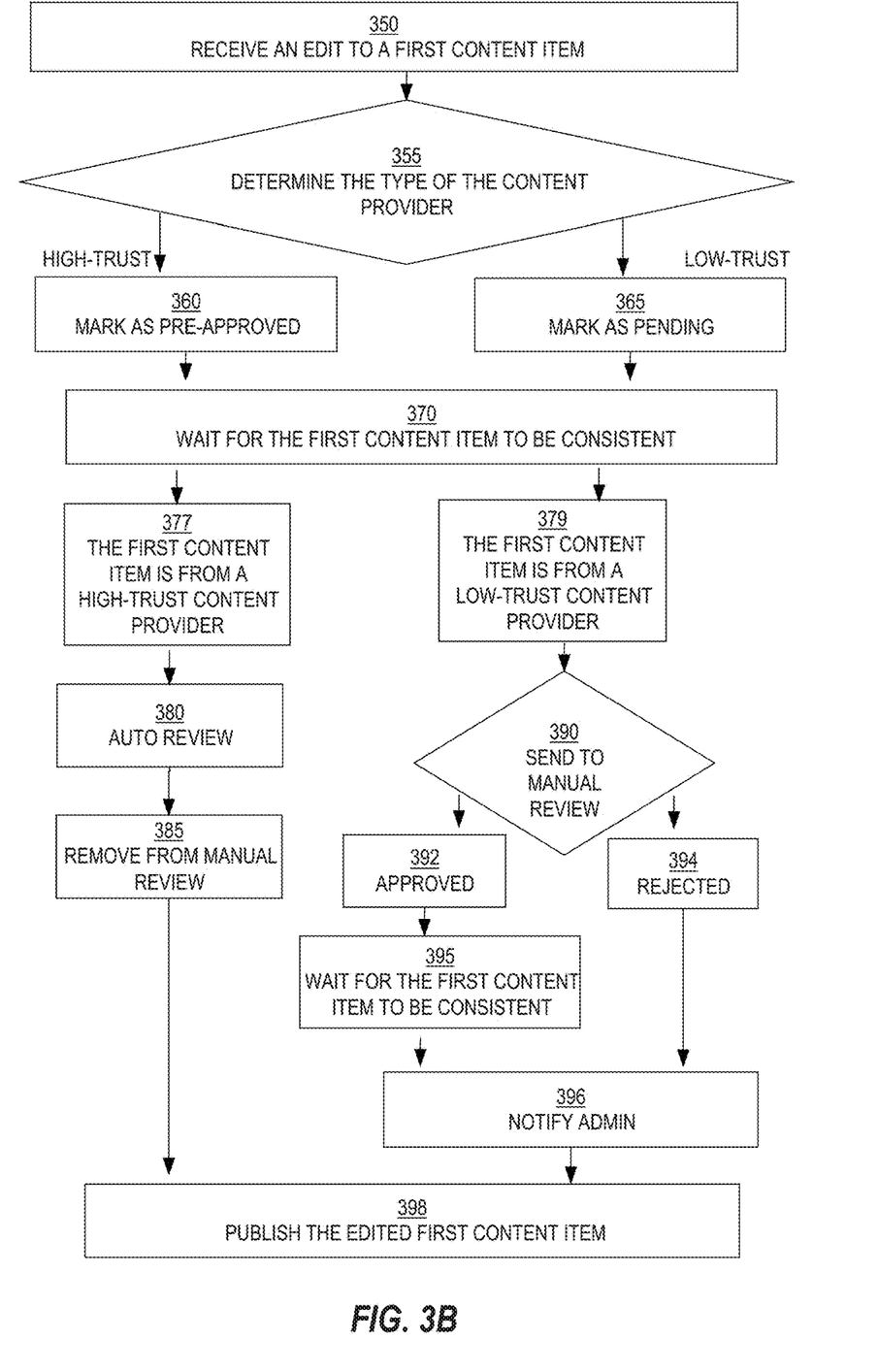

FIG. 3B is a detailed flow diagram that depicts a process for reviewing edits and editing content items, in an embodiment. The process may be implemented by content delivery system 120.

At step 350, an edit to a first content item can be received at the content delivery system 120. At block 355, the type of the content provider associated with the first content item is determined. In order to determine the type of the content provider for the first content item, a value associated with the content provider is determined. If it is determined that the first value is above a threshold value (or equals a first particular value), then the process is configured to determine that the first content item is from a high-trust content provider. At step 360, if it is determined that the first content item is from the high-trust content provider, then the edit to the first content item can be marked as pre-approved.

If the first value is below the threshold value (or equals a second particular value), then it is determined that the first content item is from a low-trust content provider. At step 365, upon determining that the first content item is from a low-trust content provider, the edit to the first content item can be marked as pending. The pending first content item is put into an event processing queue of an edit processing system, which evaluates the edit before the edit is made available through the content delivery system 120 (e.g., by storing the edit, or a result of the edit, in the second storage). The edit processing system reviews each edit in the queue and determines whether the edit is appropriate to be published. The reviewing process can differ for a content item from a high-trust content provider and a low-trust content provider. In one embodiment, the review process for a content item from the high-trust content provider can be different (e.g., simpler) than the review process for a content item from a low-trust content provider. Alternatively, the review process may be the same, except, for high-trust content providers, an edit is applied to the corresponding content item and the modified content item is made available for distribution before the entire review process is complete, such as after an automatic review process. However, a subsequent manual review process may involve determining that the edit is not approved, in which case the modified content item is no longer made available (e.g., removed from the second storage) and the previous version of the content item is made available or the corresponding content delivery campaign is paused until the content provider is notified and provides further input before resuming the campaign again.

At step 370, a replicated version (e.g., edited version of the first content item) is transmitted throughout regions associated with the first content item. For example, the first content item may be associated with two different regions, a first region (e.g., Singapore) and a second region (e.g., North America). When the edit to the first content item is received in the first region, it is expected that the edit will be consistently applied to the first content item which will be published in the second region. The process generates a replicated version of the first content item which is identical to the edited first content item and transmits the replicated version to the second region. However, it may create a delay time in data replication if two regions are not proximate to one another. Consequently, the process waits for the replicated version of the first content item to be received in the second region, ensuring that the first content item has been successfully replicated across all the regions.

Before the second version of the first content item is caused to be delivered over the computer network, a checksum of the second content item is compared to a checksum of the second version of the first content item. Upon determining that the checksum of the second content item is identical to the checksum of the second version of the first content item, the second content item may be determined to be identical to the second version of the first content item.

Upon determining that the second content item is identical to the second version of the first content item, the second version of the first content is caused to be stored in the second storage. The second content item is caused to be delivered to one or more computing devices in the second region.

Alternatively, it is determined that the checksum of the second content item is not identical to the checksum of the second version of the first content item. Consequently, it is determined that the second content item is not identical to the second version of the first content item. Subsequently, the second content item is inserted into a replication queue processing system. The replication queue processing system is a system that processes a replicated version to be transmitted to the second region to ensure that the replicated version in the second region is identical with the second version of the first content item from a first region. A result indicating that the second content item is identical to the second version of the first content item can be received from the replication queue processing system. After receiving the result that the second content item is identical to the second version of the first content item, the review process of the content items can be performed.

At step 377, the first content is determined to be from a high-trust content provider. At step 380, the first content provider is configured to be transmitted for an auto review process. At step 385, the first content item is removed from a manual review process because the first content item is from the high-trust content provider. At step 398, the edited first content can be distributed via the content delivery system 120.

Alternatively, at step 379, it may be determined that the first content item is from a low-trust content provider. At step 390, the first content item is sent for the manual review. At step 392, the edit to the first content item is approved by the manual review processing system. At step 395, the edit to the first content item is put on hold to be consistent throughout the associated regions. Steps performed in step 370 can be performed to ensure that the first content item is successfully replicated across the regions.

At step 394, it may be determined that the edit to the first content item is rejected by the manual review processing system if the edit is not appropriate to be distributed. At step 396, the status of the first content item is updated to reflect the current version of the content item. The process notifies an administrator or representative of the content provider or, more specifically, a user that initially provided the edit to content delivery system 120.

At step 398, the edited first content item is made available for publication via the content delivery system 120 for any future content item selection events that involve selecting the first content item.

Hardware Overview

Figure 4:
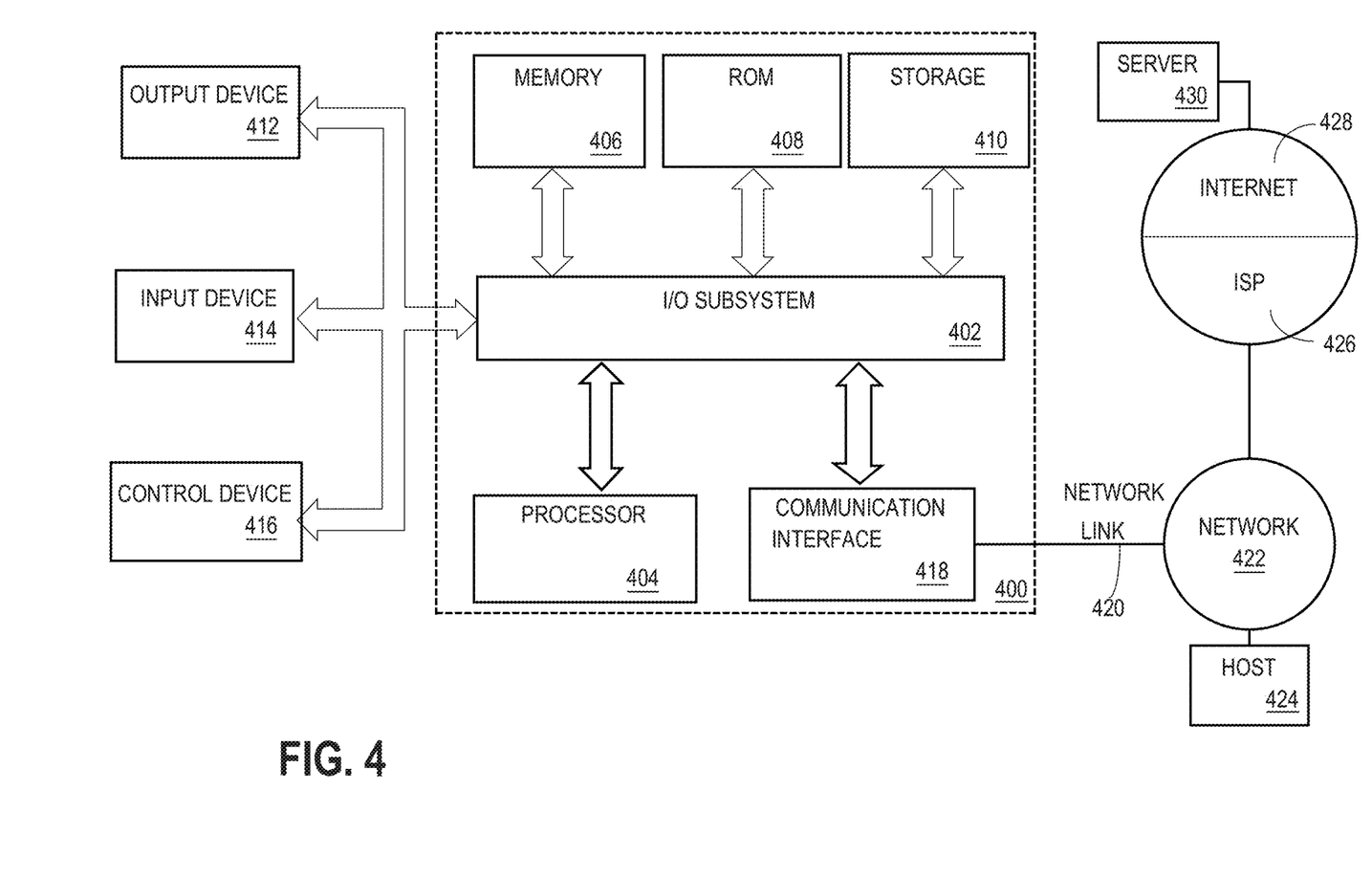
FIG. 4 is a block diagram that illustrates a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device (e.g., display) 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method implemented by a content delivery system, the method comprising:
   receiving, from a content provider that is different than the content delivery system and that provided, to the content delivery system, a content delivery campaign that includes a first content item, an edit to a first version of the first content item that has been delivered over a computer network to a first plurality of computing devices, wherein the content delivery campaign is an active content delivery campaign;
   storing the edit in a first storage that is separate from a second storage;
   in response to determining that a second content item is not identical to a second version of the first content item, inserting the second content item into a replication queue processing system;
   in response to receiving, from the replication queue processing system, a communication indicating that the second content item is identical to the second version of the first content item, inserting, into an event processing system for review of the edit, an event that indicates the edit;
   receiving, from the event processing system, a communication indicating the edit is approved to be applied to the first content item;
   in response to receiving the communication indicating the edit is approved for being applied to the first content item, causing the second version of the first content item to be stored in the second storage, the second version reflecting the edit to the first version; and
   causing the second version of the first content item to be delivered over the computer network to a second plurality of computing devices;
   wherein the method is performed by one or more computing devices.

2. The method of claim 1, further comprises:
   determining that the first content item is from a first content item provider that is different than a second content item provider, the first content item provider having a first value that is below a threshold value and the second content item provider having a second value that is above the threshold value.

3. The method of claim 1, further comprising:
determining that the first content item is associated with a first region;
receiving the second content item corresponding to the first content item, wherein the second content item is a replicated version of the first content item; and
determining that the second content item is associated with a second region different than the first region.

4. The method of claim 3, further comprising, before the second version of the first content item is caused to be delivered over the computer network:
determining that the second content item is identical to the second version of the first content item at a first time interval by comparing a checksum of the second content item to a checksum of the second version of the first content item;
wherein causing the second version of the first content item to be stored in the second storage is also performed in response to determining that the second content item is identical to the second version of the first content item at the first time interval.

5. The method of claim 3, further comprising receiving the communication indicating that the second content item is identical to the second version of the first content item before the second version of the first content item is caused to be delivered over the computer network;
wherein inserting the event into the event processing system is performed after receiving the communication indicating that the second content item is identical to the second version of the first content item.

6. The method of claim 1, further comprising:
receiving a first edit to a third content item that has been delivered over a computer network to a first set of computing devices and that is part of another active content delivery campaign;
storing the first edit in the first storage that is separate from the second storage;
inserting, into the event processing system, a first event that indicates the first edit;
receiving a second edit to the third content item, wherein the second edit is different from the first edit; and
before receiving a second communication indicating whether the first edit is approved from the event processing system, replacing the first edit to the third content item stored in the first storage with the second edit to the third content item.

7. The method of claim 6, further comprising, after replacing the first edit to the third content item with the second edit to the third content item:
receiving, from the event processing system, a third communication indicating whether the second edit to the third content item is approved;
in response to receiving the third communication indicating that the second edit to the third content item is approved, causing the second edit to the third content item to be stored in the second storage; and
causing the second edit to the third content item to be delivered over the computer network to a second set of computing devices.

8. The method of claim 6, further comprises:
sending, to a computing device of a particular content provider, a notification indicating the second edit to the third content item is approved by the event processing system.

9. The method of claim 1, wherein the first storage is a buffered database and the second storage is a database that stores and references up-to-date content.

10. One or more non-transitory computer-readable storage media storing instructions that, when executed by one or more processors, perform a method comprising:
receiving, by a content delivery system, from a content provider that is different than the content delivery system and that provided, to the content delivery system, a content delivery campaign that includes a first content item, an edit to a first version of the first content item that has been delivered over a computer network to a first plurality of computing devices, wherein the content delivery campaign is an active content delivery campaign;
storing the edit in a first storage that is separate from a second storage;
in response to determining that a second content item is not identical to a second version of the first content item, inserting the second content item into a replication queue processing system;
in response to receiving, from the replication queue processing system, a communication indicating that the second content item is identical to the second version of the first content item, inserting, into an event processing system for review of the edit, an event that indicates the edit;
receiving, from the event processing system, a communication indicating the edit is approved to be applied to the first content item;
in response to receiving the communication indicating the edit is approved for being applied to the first content item, causing a second version of the first content item to be stored in the second storage, the second version reflecting the edit to the first version; and
causing the second version of the first content item to be delivered over the computer network to a second plurality of computing devices;
wherein the method is performed by one or more computing devices.

11. The one or more non-transitory computer-readable storage media claim 10, when executed, the method further comprising:
determining that the first content item is from a first content item provider that is different than a second content item provider, the first content item provider having a first value that is below a threshold value and the second content item provider having a second value that is above the threshold value.

12. The one or more non-transitory computer-readable storage media of claim 10, when executed, the method further comprising:
determining that the first content item is associated with a first region;
receiving the second content item corresponding to the first content item, wherein the second content item is a replicated version of the first content item; and
determining that the second content item is associated with a second region different than the first region.

13. The one or more non-transitory computer-readable storage media of claim 12, when executed, the method further comprising, before the second version of the first content item is caused to be delivered over the computer network:
determining that the second content item is identical to the second version of the first content item at a first time interval by comparing a checksum of the second content item to a checksum of the second version of the first content item;

wherein causing the second version of the first content item to be stored in the second storage is also performed in response to determining that the second content item is identical to the second version of the first content item at the first time interval.

14. The one or more non-transitory computer-readable storage media of claim 12, when executed, the method further comprising receiving the communication indicating that the second content item is identical to the second version of the first content item before the second version of the first content item is caused to be delivered over the computer network;

wherein inserting the event into the event processing system is performed after receiving the communication indicating that the second content item is identical to the second version of the first content item.

15. The one or more non-transitory computer-readable storage media of claim 10, when executed, the method further comprising:

receiving a first edit to a third content item that has been delivered over the computer network to a first set of computing devices and that is part of another active content delivery campaign;

storing the first edit in the first storage that is separate from the second storage;

inserting, into the event processing system, a first event that indicates the first edit;

receiving a second edit to the third content item, wherein the second edit is different from the first edit; and before receiving a second communication indicating whether the first edit is approved from the event processing system, replacing the first edit to the third content item stored in the first storage with the second edit to the third content item.

16. The one or more non-transitory computer-readable storage media of claim 15, when executed, the method further comprising, after replacing the first edit to the third content item with the second edit to the third content item:

receiving, from the event processing system, a third communication indicating whether the second edit to the third content item is approved;

in response to receiving the third communication indicating that the second edit to the third content item is approved, causing the second edit to the third content item to be stored in the second storage; and causing the second edit to the third content item to be delivered over the computer network to a second set of computing devices.

17. The one or more non-transitory computer-readable storage media of claim 15, when executed, the method further comprising:

sending, to a computing device of a particular content provider, a notification indicating the second edit to the third content item is approved by the event processing system.

18. The one or more non-transitory computer-readable storage media of claim 10, wherein the first storage is a buffered database and the second storage is a database that stores and references up-to-date content.

19. A system comprising:

a processor; and a memory storing instructions that, when executed by the processor, cause the processor to:

receive, from a content provider that is different than a content delivery system and that provided, to the content delivery system, a content delivery campaign that includes a first content item, an edit to a first version of the first content item that has been delivered over a computer network to a first plurality of computing devices, wherein the content delivery campaign is an active content delivery campaign;

store the edit in a first storage that is separate from a second storage;

in response to determining that a second content item is not identical to a second version of the first content item, insert the second content item into a replication queue processing system;

in response to receiving, from the replication queue processing system, a communication indicating that the second content item is identical to the second version of the first content item, insert, into an event processing system for review of the edit, an event that indicates the edit;

receive, from the event processing system, a communication indicating the edit is approved to be applied to the first content item;

in response to receiving the communication indicating the edit is approved for being applied to the first content item, cause a second version of the first content item to be stored in the second storage, the second version reflecting the edit to the first version; and cause the second version of the first content item to be delivered over the computer network to a second plurality of computing devices.

20. The system of claim 19, wherein the first storage is a buffered database and the second storage is a database that stores and references up-to-date content.

* * * * *